United States Patent Office 3,553,199
Patented Jan. 5, 1971

3,553,199
REACTION OF 2-AMINOBENZOPHENONE AMINES AND BENZHYDRYL AMINES WITH DI-LEAVING GROUP-SUBSTITUTED ETHANE
Giles A. Archer, Essex Fells, and Leo Henryk Sternbach, Upper Montclair, N.J., assignors to Hoffmann-La Roche Inc., Nutley, N.J., a corporation of New Jersey
No Drawing. Filed Mar. 17, 1967, Ser. No. 623,834
Int. Cl. C07d 53/06
U.S. Cl. 260—239
7 Claims

ABSTRACT OF THE DISCLOSURE

When benzophenone imines or benzhydrylamines are reacted with 1,2-di-leaving group-substituted ethanes, there are obtained known 1,4-benzodiazepines. The latter compounds are useful as anti-convulsants, muscle relaxants and sedatives.

BACKGROUND OF THE INVENTION

Such known 1,4-benzodiazepines which are of the formula

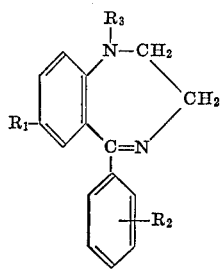

(I)

wherein $R_1$ and $R_2$ are selected from the group consisting of hydrogen and halogen and $R_3$ is selected from the group consisting of hydrogen and lower alkyl and of the formula

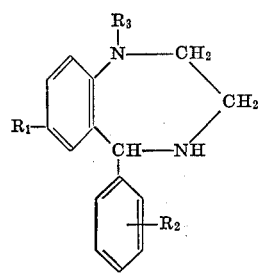

(II)

wherein $R_1$, $R_2$ and $R_3$ are as above as are prepared by techniques herein described, have been synthesized heretofore by a wide variety of reaction routes. The invention described hereinafter results from the unexpected discovery that by the single step procedure disclosed herein which utilizes inexpensive starting materials, a facile route to the known 1,4-benzodiazepines of the Formulae I and II above can be provided.

DETAILED DESCRIPTION OF THE INVENTION

In one advantageous process aspect, 1,4-benzodiazepines of the Formula I above are prepared via the reaction of an imine of the formula

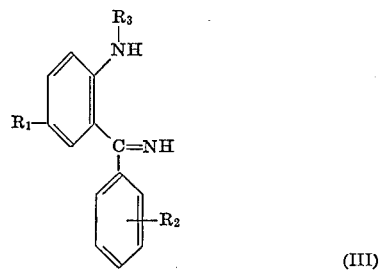

(III)

wherein $R_1$, $R_2$ and $R_3$ are as above with a compound of the formula $$X-CH_2CH_2-X' \qquad (IV)$$

wherein X and X' are any suitable leaving group capable of functioning efficaciously for the purposes of the present invention. Preferably X and X' are selected from the group consisting of halogen, aryl sulfonyl, e.g. a phenyl sulfonyl such as benzene sulfonyl and tosyl and an alkyl sulfonyl group such as mesyl.

The reaction can be effected utilizing a compound of the Formula IV above in excessive amounts whereby it serves the two-fold purpose of being a participant in the ensuing reaction as well as the medium in which the reaction is effected. Thus, by the convenient step of providing a compound of the Formula IV above in excessive amounts, the solvent medium and a reaction partner are provided. Alternatively, the conversion of the compound of the Formula III above into a corresponding compound of the Formula I can be effected in the presence of any suitable inert oranic solvent such as an aromatic hydrocarbon, e.g. toluene, benzene, a halogenated hydrocarbon such as a chlorobenzene, an ether such as ethyl ether and dibutyl ether, a lower alkanol such as methanol and 2-ethoxy ethanol and the like. If desired, the reaction can be carried out in the presence of an acid acceptor such as pyridine or triethylamine, tributylamine and the like whereby the acid acceptor serves to accept any hydrohalide formed. However, an acid acceptor is not essential to a successful performance of the ensuing reaction as any hydrohalide formed would join to a compound of the Formula I above yielding the same in salt form. While temperature and pressure are not critical aspects of the process aspect leading from a compound of the Formula III to the corresponding compound of the Formula I above, it is preferred to effect the reaction at elevated temperatures, preferably, at from about 50° to about the reflux temperature of the reaction media, most preferably, under refluxing conditions.

In a particularly preferred process aspect, starting materials of the Formula III above wherein $R_1$ is halogen, most advantageously, chlorine and $R_2$ is hydrogen are utilized. In a more advantageous aspect of this process embodiment, compounds of the Formula III above are utilized wherein $R_1$ is chlorine; $R_2$ is hydrogen and $R_3$ is methyl to thereby obtain the corresponding compound of the Formula I above wherein $R_1$ is chlorine, $R_2$ is hydrogen and $R_3$ is methyl. Compounds of the Formula I and particularly compounds of the Formula I where $R_1$ is chlorine; $R_2$ is hydrogen and $R_3$ is methyl are useful for pharmacological purposes, e.g. as muscle relaxants, sedatives and anticonvulsants.

In another process aspect of the present invention, compounds of the Formula II above can be prepared by reacting a compound of the formula

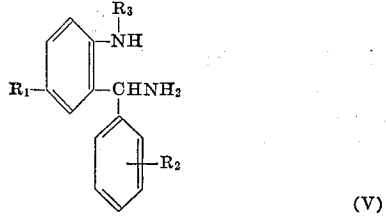

(V)

wherein $R_1$, $R_2$ and $R_3$ are as above with a compound of the Formula IV above. The reaction conditions described hereinabove in connection with the preparation of a compound of the Formula I from the corresponding compound of the Formula III above are equally applicable in this process aspect which involves the reaction of a compound of the Formula V above with a compound of the Formula IV above to thereby prepare the corresponding compound of the Formula II above.

X and X' in the Formula IV above may be the same or different radicals. All that is required of them is that they are suitable for the purposes of the present invention. Hence, there is contemplated the use of any leaving group which can be employed in the reaction sequence to effect the desired end. A particularly preferred class of compound of the Formula IV preferred for use in the preparative technique herein specified is of the formula halo-$CH_2CH_2$-halo and representative of these are ethylene dibromide, 1-chloro-2-bromoethane, ethylene dichloride, 1-iodo-2-bromoethane and the like. A compound of the Formula IV above which is most advantageous for the purposes of the present invention is ethylene dibromide.

Compounds of the Formula IV also suitable for the purposes of the present invention are ethylene ditosylate, ethylene dibenzenesulfonate and ethylene dimesylate.

The foregoing is a description of a new and novel process for the 1,4-benzodiazepines. It will be readily apparent to one skilled in the art that variations in these procedures are possible.

The following examples are illustrative but not limitative for preparing the aforesaid 1,4-benzodiazepines. All temperatures are stated in degrees centigrade.

EXAMPLE 1

2-methylamino-5-chlorobenzophenone imine (1 gm., 4.08 mm.) in ethylene dibromide (10 ml.; 21.7 gm., 115 ml. of 4-methyl-2-pentanone and a few crystals eof potas- the reaction medium became deep orange. The mixture was evaporated and the residue was partitioned between dilute hydrochloric acid and ether. The resulting mixture was left overnight to hydrolyze any unchanged imine, and then the acid layer was made basic with dilute sodium hydroxide. 7-chloro-2,3-dihydro-1-methyl-5-phenyl-1H-1,4-benzodiazepine was recovered by extraction of the acid layer with ether, and obtained as a yellow-brown gum. The product was further purified by filtration of a benzene solution through "Woelm" neutral alumina, activity III (2 gm.). Evaporation of the eluates and crystallization from hexane, gave pale yellow prisms of the product, M.P. 97–99° C.

The 2-methylamino-5-chlorobenzophenone imine utilized above was prepared as follows:

A mixture of 97 g. of 5-chloro-2-methylaminobenzophenone, 200 ml. of ammonia, 2 g. of zinc chloride and 200 ml. of methanol was placed in an autoclave which was then charged with an overpressure of 15 atoms of nitrogen and heated for 24 hours at 145°. The resulting solution was then evaporated. The residue was taken up in 300 ml. of dichloromethane and the resultant medium was washed, dried and evaporated. Recrystallization of the residue from methanol gave 2-methylamino-5-chlorobenzophenone imine as yellow prisms, melting at 95–97°.

EXAMPLE 2

In a similar manner as described in Example 1, 2-amino-5-chlorobenzophenone imine was reacted with ethylene dibromide to give 7-chloro-2,3-dihydro-5-phenyl-1H-1,4-benzodiazepine.

EXAMPLE 3

2-methylamino-5-chlorobenzhydrylamine (1 gm., 4.05 mm.) in ethylene dibromide (10 ml. 21.7 gm., 115 mm.) was stirred and refluxed for 24 hours. The mixture was evaporated, and the residue was partitioned between ether and dilute hydrochloric acid. The acid aqueous layer was made basic with dilute sodium hydroxide, and the crude product was recovered by extraction of the acid layer with methylene chloride. Evaporation of the extract gave a yellow-brown gum which was dissolved in benzene, and purified by chromatography on a column of "Woelm" neutral alumina, activity III (17 gm.). Evaporation of the eluates gave 7-chloro-5-phenyl-1-methyl-2,3,4,5-tetrahydro-1H-1,4-benzodiazepine which was further purified by distillation in a straight tube at 130–150° C./0.1 mm. The base was converted to the picrate, namely, 7-chloro-5-phenyl-1-methyl - 2,3,4,5 - tetrahydro-1H-1,4-benzodiazepine picrate by treatment of an ethereal solution thereof with 5% picric acid in ethanol (W/V). Recrystallization of the picrate from ethanol give bright yellow prisms, M.P. 201–203° C.

2-methylamino-5-chloro-benzhydrylamine is prepared as follows:

A mixture of 90 g. (0.346 m.) of 2-methylamino-5-chlorobenzophenone oxime, 1 liter of ethanol, 135 cc. (0.81 m.) of 6 N hydrochloric acid and 15 g. of 10% palladium on carbon catalyst is hydrogenated at 50–60°, in a rocking autoclave, until two moles of hydrogen are absorbed. The filtrate is concentrated to dryness in vacuo. The resulting oil is dissolved in 700 cc. of water and extracted with three 300 cc. portions of methylene chloride. The aqueous solution is alkalized with 40% sodium hydroxide solution, (w./v.) and then it is extracted again with three 300 cc. portions of methylene chloride. The methylene chloride extracts are combined and washed with two 200 cc. portions of water. The so-washed medium is dried over sodium sulfate, filtered and concentrated to dryness in vacuo to give an oil. The oil, while still warm, is dissolved in 150 cc. of ether. The resulting crystals are isolated and washed with ether giving 2-methylamino-5-chlorobenzhydrylamine, M.P. 108–111°. Upon recrystallization from ether, the product melted at 113–115°.

EXAMPLE 4

In a similar manner as described above, 7-chloro-5-phenyl-2,3,4,5-tetrahydro-1H-1,4-benzodiazepine was prepared via the reaction of 2-amino-5-chloro-benzhydrylamine with ethylene dibromide.

What is claimed is:

1. A process for preparing a compound of the formula

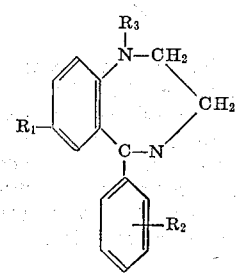

(I)

wherein $R_1$ and $R_2$ are selected from the group consisting of hydrogen and halogen and $R_3$ is selected from the group consisting of hydrogen and lower alkyl which comprises reacting an imine of the formula

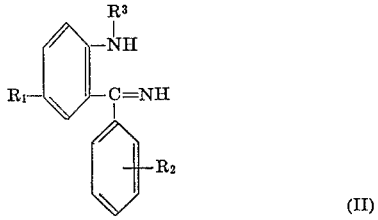

(II)

wherein $R_1$, $R_2$ and $R_3$ are as above with a compound of the formula

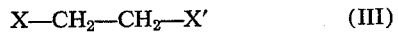

$$X-CH_2-CH_2-X' \qquad (III)$$

wherein X and X' are selected from the group consisting of halogen, aryl sulfonyl and alkyl sulfonyl.

2. A process as defined in claim 3 wherein the compound of the Formula III utilized is of the formula halo-$CH_2CH_2$-halo.

3. A process as defined in claim 2 wherein the reaction is effected under refluxing conditions.

4. A process as defined in claim 3 wherein the compound of the formula halo-$CH_2$—$CH_2$-halo utilized is ethylene dibromide.

5. A process as defined in claim 2 wherein a compound of the Formula II in which $R_1$ represents chlorine, $R_2$ represents hydrogen and $R_3$ represents methyl is utilized as a starting material whereby 7-chloro-2,3-dihydro-1-methyl-5-phenyl-1H-1,4-benzodiazepine is obtained.

6. A process as defined in claim 5 wherein the reaction is effected under refluxing conditions.

7. A process as defined in claim 6 wherein the compound of the formula halo-$CH_2CH_2$-halo utilized is ethylene dibromide.

References Cited

UNITED STATES PATENTS

| | | | |
|---|---|---|---|
| 2,483,434 | 10/1949 | Rieveschl | 260—570 |
| 3,243,427 | 3/1966 | Reeder et al. | 260—239 |

OTHER REFERENCES

Ichii, J. Pharm. Soc. Japan, vol. 82, pps. 999–1004 (1962).

Ichii, Chem. Abstracts, vol. 58, 5666 (1963).

Smith, The Chemistry of Open-Chain Organic Nitrogen Compounds, vol. 1, (New York, 1965), pps. 306–307.

ALTON D. ROLLINS, Primary Examiner

U.S. Cl. X.R.

260—566, 570

PO-1050
(5/69)

UNITED STATES PATENT OFFICE
CERTIFICATE OF CORRECTION

Patent No. 3,553,199  Dated January 5, 1971

Inventor(s) Giles A. Archer and Leo Henryk Sternbach

It is certified that error appears in the above-identified patent and that said Letters Patent are hereby corrected as shown below:

Column 4, line 70, Claim 1

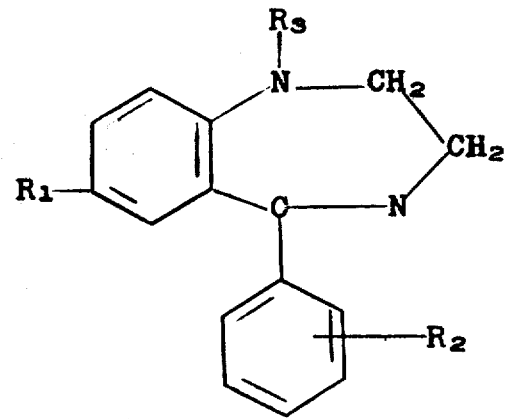

should be

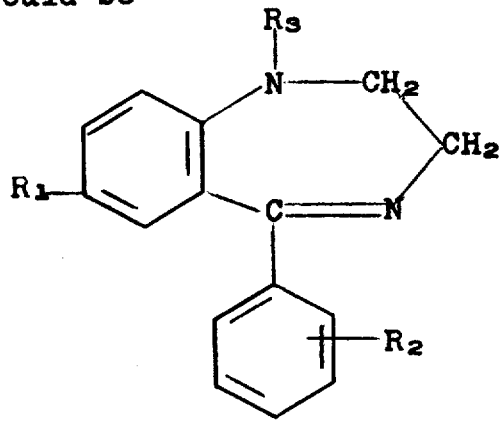

PO-1050
(5/69)

UNITED STATES PATENT OFFICE
CERTIFICATE OF CORRECTION

Patent No. 3,553,199           Dated_____

Inventor(s)_____

It is certified that error appears in the above-identified patent and that said Letters Patent are hereby corrected as shown below:

Column 5, line 19, claim 2

"Claim 3"    should be

<u>Claim 1</u>

Signed and sealed this 24th day of August 1971.

(SEAL)
Attest:

EDWARD M. FLETCHER, JR.　　　　　　WILLIAM E. SCHUYLER, JR.
Attesting Officer　　　　　　　　　Commissioner of Patents